United States Patent
Van Den Broeck et al.

(10) Patent No.: US 9,930,028 B2
(45) Date of Patent: Mar. 27, 2018

(54) METHOD TO ENROLL A CERTIFICATE TO A DEVICE USING SCEP AND RESPECTIVE MANAGEMENT APPLICATION

(71) Applicant: THOMSON LICENSING, Issy les Moulineaux (FR)

(72) Inventors: Roeland Van Den Broeck, Schilde (BE); Bruno De Bus, Hamme (BE)

(73) Assignee: Thomson Licensing, Issy-les-Moulineaux (FR)

( * ) Notice: Subject to any disclaimer, the term of this patent is extended or adjusted under 35 U.S.C. 154(b) by 0 days.

(21) Appl. No.: 14/902,032

(22) PCT Filed: Jun. 26, 2014

(86) PCT No.: PCT/EP2014/063585
§ 371 (c)(1),
(2) Date: Dec. 30, 2015

(87) PCT Pub. No.: WO2015/000795
PCT Pub. Date: Jan. 8, 2015

(65) Prior Publication Data
US 2016/0373431 A1    Dec. 22, 2016

(30) Foreign Application Priority Data

Jul. 1, 2013 (EP) .................................. 13305933
Sep. 30, 2013 (EP) .................................. 13306347

(51) Int. Cl.
*H04L 29/06* (2006.01)
*H04L 9/32* (2006.01)

(52) U.S. Cl.
CPC .......... *H04L 63/0823* (2013.01); *H04L 63/06* (2013.01); *H04L 63/083* (2013.01); *H04L 9/3268* (2013.01); *H04L 63/168* (2013.01)

(58) Field of Classification Search
CPC ... H04L 63/0823; H04L 63/06; H04L 63/083; H04L 63/168; H05L 9/3268
See application file for complete search history.

(56) References Cited

U.S. PATENT DOCUMENTS

| | | | |
|---|---|---|---|
| 8,392,712 B1 | 3/2013 | Wilson | |
| 2005/0132182 A1* | 6/2005 | Challener | G06F 21/57 713/150 |

(Continued)

FOREIGN PATENT DOCUMENTS

WO    WO03071736    8/2003

OTHER PUBLICATIONS

Hudson Etal: "Network Enrollment Service (NDES) in Active Directory Certificate Services (AD CS)";Apr. 15, 2013; Wiki;Technet article; pp. 2-27.

(Continued)

*Primary Examiner* — Ghodrat Jamshidi
(74) *Attorney, Agent, or Firm* — Myers Wolin LLC

(57) ABSTRACT

The method to enroll a certificate to a device comprises the steps of providing a management application on a management device, the management application discovering a device that needs certificate enrollment, wherein the discovery information includes a public key of the device. The management application forwards the public key of the device to a certificate enrollment server, and the device requests a certificate enrollment at the certificate enrollment server by including the public key of the device at the certificate request for a secure certificate enrollment to the device.

13 Claims, 3 Drawing Sheets

(56) References Cited

U.S. PATENT DOCUMENTS

| | | | |
|---|---|---|---|
| 2008/0016336 A1* | 1/2008 | Stirbu | H04L 63/0823 |
| | | | 713/156 |
| 2010/0138907 A1* | 6/2010 | Grajek | H04L 9/3263 |
| | | | 726/10 |
| 2012/0166796 A1 | 6/2012 | Metke et al. | |
| 2012/0167162 A1* | 6/2012 | Raleigh | G06F 21/57 |
| | | | 726/1 |
| 2013/0179947 A1* | 7/2013 | Kline, III | H04L 67/28 |
| | | | 726/4 |

OTHER PUBLICATIONS

Search Report dated October 21, 2014.

* cited by examiner

Fig. 1: Prior art

METHOD TO ENROLL A CERTIFICATE TO A DEVICE USING SCEP AND RESPECTIVE MANAGEMENT APPLICATION

This application claims the benefit, under 35 U.S.C. § 365 of International Application PCT/EP2014/063585, filed Jun. 26, 2014, which was published in accordance with PCT Article 21(2) on Jan. 8, 2015 in English and which claims the benefit of European patent application No. 13305933.7, filed Jul. 1, 2013 and European patent application No. 13306347.9, filed Sep. 30, 2013.

TECHNICAL FIELD

The invention relates to the field of network devices and certificate enrollment for external devices, in particular for mobile devices.

BACKGROUND OF THE INVENTION

A computer network within an enterprise, e.g. a company, is a communications network that allows the computers of the network to exchange data. As the computers, many kinds of devices can be considered, for example main frame computers, servers, personal computers (PC), laptops, tablet PCs and private smart phones. Securing the computers in the computer network can be therefore a complex problem.

For computer networks within an enterprise, BYOD (Bring Your Own Device) solutions are known that use a method based on SCEP (Simple Certificate Enrollment Protocol), which allows employees also to connect their private devices, e.g. a laptop or a smart phone, to the network. BYOD links the company user database with the SCEP infrastructure. SCEP is a public key infrastructure (PKI) communication protocol, which current version is defined by the Internet Engineering Task Force (IETF) as an Internet Draft, version SCEP-23. SCEP defines a protocol for certificate management and certificate and certificate revocation list queries in a close environment. Entity types defined by SCEP are a requester, e.g. a client or a device, and a SCEP server, which may be either a Certificate Authority (CA) or a Registration Authority (RA). SCEP supports CA and RA public key distribution and certificate enrollment.

The SCEP server is the entity that signs device or client certificates and performs validation and authorisation checks of the SCEP requester, and forwards the certification requests to the CA. A requester starts a certificate enrollment transaction by creating a certificate request and sends it to the certificate authority. A certificate may be granted automatically, or may be granted manually by the administrator. A fingerprint is created by calculating a hash, e.g. a SHA-1 hash, on the whole CA certificate. SCEP is used in particular by network administrators of companies to enroll certificates to devices they manage. This is the original idea behind SCEP. Once the certificate is available, the device can setup connections with other devices and services of the company network.

A standard SCEP certification enrollment is described in more detail with regard to FIG. 1: A requester, for example an administrator A of a company, logs in to a SCEP server B and activates an enrollment process for a device C by transmitting a certification request, step 1. The administrator may use for this process an administration computer or any other computer of the company network, administrator device D. The device C is for example a smart phone of an employee of the company. The SCEP server B provides then a CA certificate for the device C, and the SCEP server B generates also a password, a one-time code (OTC), and a fingerprint of the CA certificate and transmits the fingerprint and the OTC to the administrator A, step 2.

After having received the OTC, the administrator A logs in to the device C and starts-up an enrollment process for the device C by providing the OTC to the device C, step 3. The device C may be connected via Ethernet or via a Wi-Fi connection with the company network. The administrator generates then a certificate signing request (CSR) on the device C and sends it to the SCEP server B together with the OTC, step 4. The SCEP server B verifies the OTC of the device C and if the OTC is correct, the SCEP server B sends the CA certificate signed by the fingerprint to the device C, step 5. The administrator accepts the received CA certificate, if the fingerprint of the CA certificate is valid based on the fingerprint as received from the SCEP server B in step 2. The device C is now ready for operation within the company network.

This solution introduces several weaknesses and the procedure is difficult. The standard SCEP is also difficult to administer. If used correctly, the administrator needs to interact both with the SCEP server and with the device that needs the certificate.

U.S. Pat. No. 8,392,712 discloses a system and method for provisioning a unique device credential, comprising a first operation of determining one or more device characteristics of an electronic device seeking to join the network and generating one or more unique device credentials for the electronic device. The format of the unique device credentials is based on the one or more device characteristics of the electronic device.

US 2012/0166796 discloses a system and method of managing device certificates in a communication network, wherein a certificate manager transmits a certificate service advertisement to a plurality of certificate clients. Responsive to the transmitting of the certificate service advertisement, the certificate manager receives a certificate service request from at least one of the certificate clients. The certificate manager verifies that the at least one certificate client is associated with a set of clients for which the certificate manager offers a service, and the certificate manager fulfills the certificate service request.

The Network Device Enrollment Service (NDES) in Active Directory Certificate Services (ADCS) is an implementation of SCEP by Microsoft for Microsoft servers.

SUMMARY OF THE INVENTION

The invention describes a method to enroll a certificate to a device, comprising the steps of providing a management application on a management device, the management application discovering a device that needs certificate enrollment, wherein the discovery information includes a public key of the device. In further steps, the management application forwards the public key of the device to a certificate enrollment server, and the device requests a certificate enrollment at the certificate enrollment server by including the public key of the device in the certificate request for a secure certificate enrollment to the device.

In an aspect of the invention, for a certificate enrollment, the management application on the management device is activated, via which the certificate enrollment for the device is started. In further steps, the device sends a certificate signing request (CSR) to the certificate enrollment server, the CSR containing the public key of the device, and the certificate enrollment server signs the CSR of the device and provides the certificate to the device, if the public key matches the public key that was forwarded by the application to the certificate enrollment server and sends the signed certificate back to the device.

In a further aspect of the invention, the management application contacts the certificate enrollment server. The administrator logs in to the certificate enrollment server by using the correct user and password combination and caches the credentials for later use. The application verifies the authenticity of the certificate enrollment server by verifying a digitally signed server certificate of the certificate enrollment server, to improve further the security of the enrollment process.

In a preferred embodiment, the certificate enrollment server is a SCEP server, and a Data Distribution Service for Real-Time Systems (DDS) or a Simple Service Discovery Protocol (SSDP) for a discovery of the device is used. The management device is advantageously an administration computer of a company network.

The invention defines therefore a simplified method to enroll a certificate to a device by introducing a management application that combines a certificate enrollment server with a discovery of the device: The management application is installed by the administrator on his management device. The administrator needs to activate the enrollment process just by activating the application, e.g. by clicking on a button on a display of the management device. The device that needs a certificate is discovered by the management application by using any standard discovery protocol, e.g.: DDS. The certificate enrollment is secured because a public key of the device is used.

The invention discloses also a non-transitory computer-readable storage medium, on which a management application is stored, being adapted for operation on a computer, e.g. a management computer of a company network, for performing the method. The computer-readable storage medium is for example a read-only optical disc.

BRIEF DESCRIPTION OF THE DRAWINGS

Preferred embodiments of the invention are explained in more detail below by way of example with reference to schematic drawings, which show.

DETAILED DESCRIPTION OF PREFERRED EMBODIMENTS

In the following description, a simplified method to enroll a certificate to a device is described utilizing a management application on a management device. For purposes of explanation, numerous specific details are set forth in order to provide a thorough understanding of the embodiments. It will be evident, however, to one skilled in the art that the present invention may be practiced without these specific details.

Figure 1:
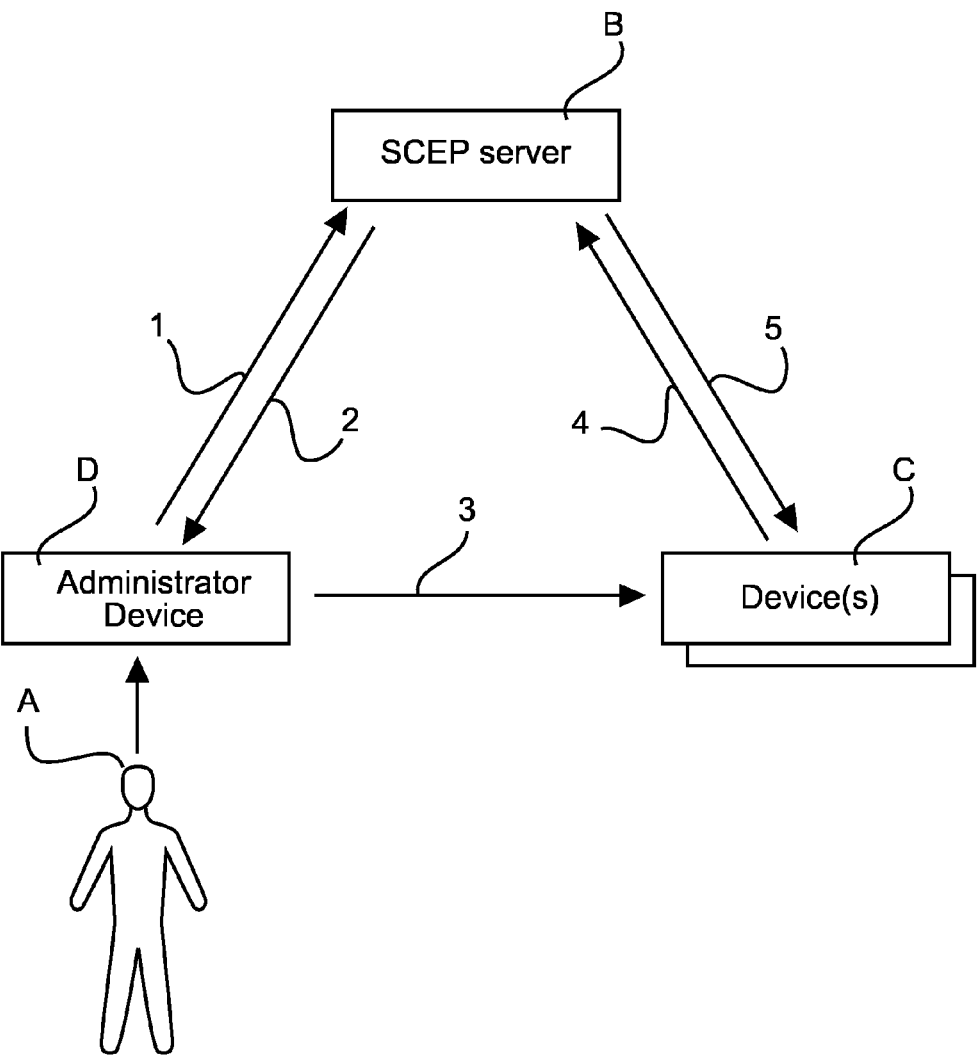
FIG. 1 a SCEP certification enrollment for a device according to prior art.
Figure 2:
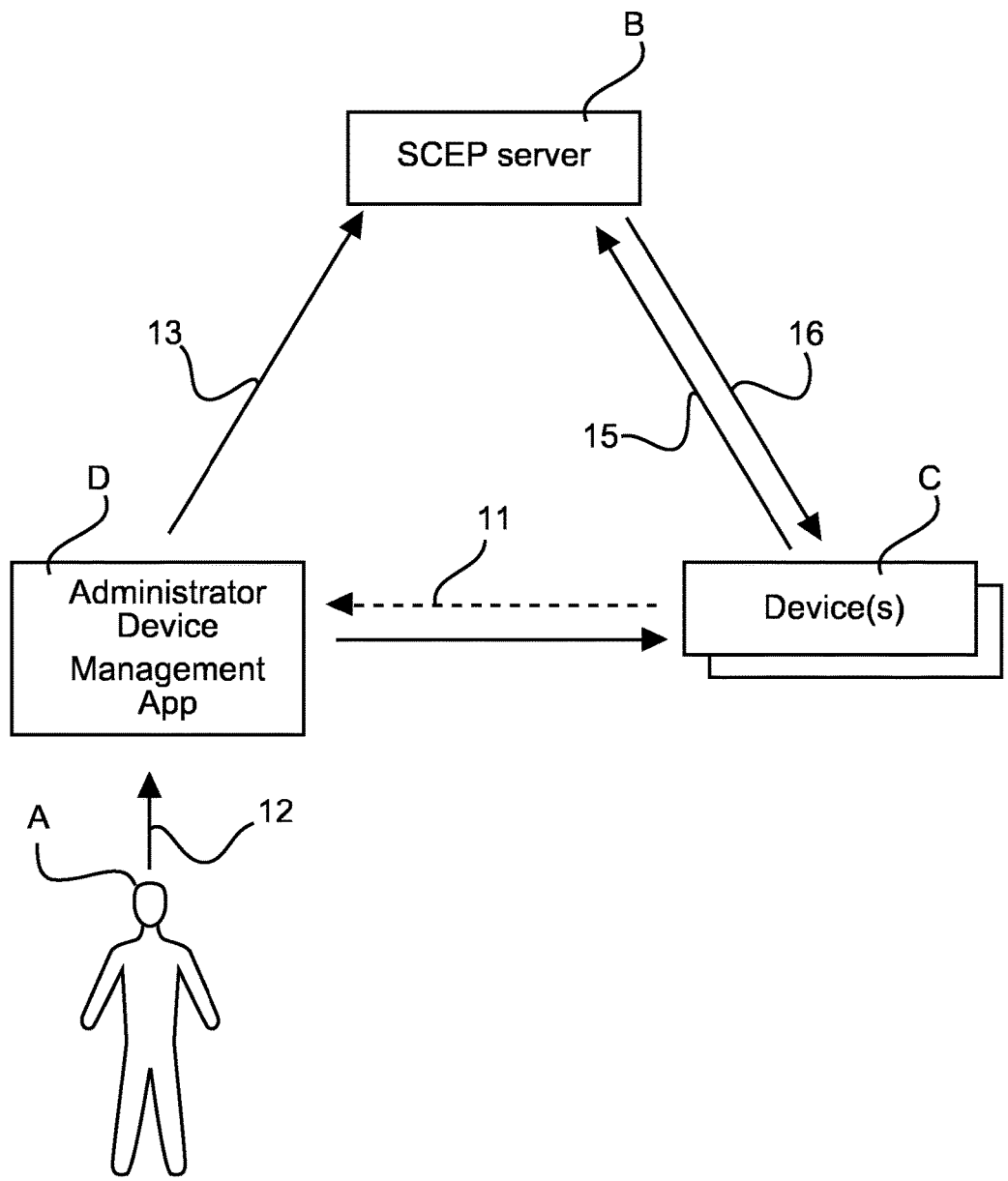
FIG. 2 a SCEP certification enrollment for a device according to the invention, and FIG. 3 a flow diagram for a method for a certificate enrollment process in accordance with the FIG. 2.

As depicted in FIG. 2, an administrator A has a management device D, for example an administration computer or any computer of a company network, with a management application installed. The management application is configured to login to a Simple Certificate Enrollment Protocol (SCEP) server B, by using a configurable Uniform Resource Locator (URL) of the SCEP server B and by using cached administrator credentials of the administrator being forwarded to the SCEP server B. To ensure that the communication with the SCEP server B is secure, the SCEP server B is provided also with an officially signed certificate of the administrator for authentication.

In a preferred embodiment, the following steps are involved in the simplified certificate enrollment process: When the management application is activated, it discovers devices C connected to the company network that need enrollment, step 11. The devices are for example mobile devices, e.g. smart phones, tablet PCs, notebooks, etc. being connected via Ethernet or via a Wi-Fi connection with the company network. The discovery information contains the public key of the mobile devices C. Standard discovery mechanisms can be used for discovery, e.g. a Data Distribution Service for Real-Time Systems (DDS), a Simple Service Discovery Protocol (SSDP), etc.

The administrator activates then the enrollment process for one of the mobile devices C by using the management application, step 12. The enrollment process may be activated also for several devices C at the same time. A simple press on a button can be sufficient on a graphical display of the administration computer, e.g. a start button. The management application contacts then the SCEP server B using the cached administrator credentials as described before, verifies the authenticity of the SCEP server B by verifying a SCEP server certificate, and the management application starts the enrollment process by forwarding the public key of the mobile device C to the SCEP server B, step 13. The SCEP server certificate is in particular a digitally signed certificate, e.g. a public key certificate. In a further step, the management application notifies the mobile device C to apply for enrollment. If necessary, the management application also forwards the SCEP server's URL, server certificate fingerprint, etc. to the mobile device C. The notification transmitted to the device C can be protected with a public key of the mobile device C that wants to enroll.

Figure 3:
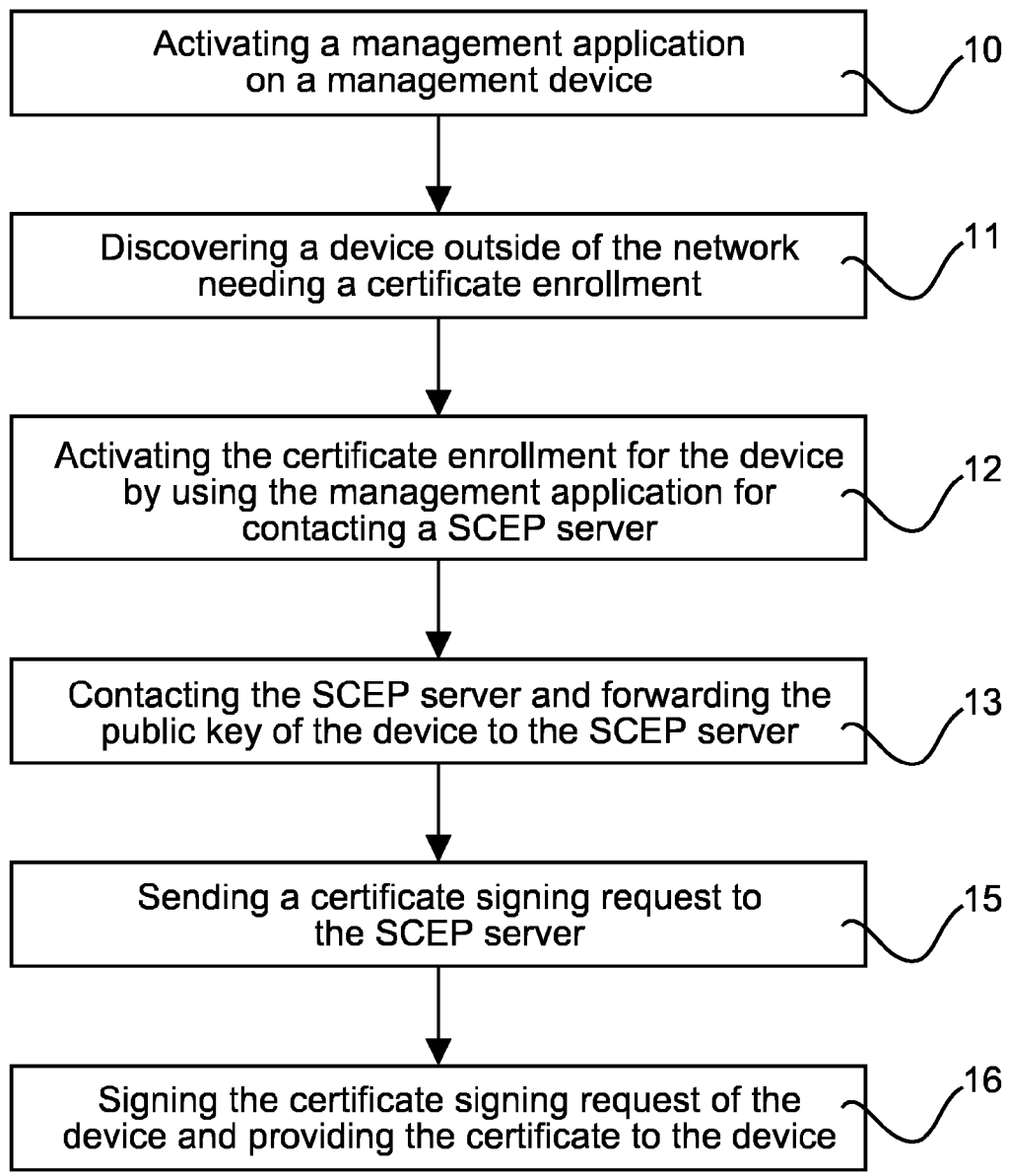

After having received the notification, the mobile device C sends a Certificate Signing Request (CSR) to the SCEP server B, step 15. The CSR contains the public key of the mobile device C. The SCEP server acts as a certificate authority and will accept the CSR of the mobile device if the contained public key matches the public key that was forwarded by the management application in step 13. The SCEP server B sends then a signed certificate back to the mobile device, step 16. The mobile device C is now ready for use within the company network. Essential steps of this preferred embodiment of the method for certificate enrollment, after the management application has been activated on the management device, step 10, are illustrated in a flow chart shown in FIG. 3.

The invention provides therefore a simplified method of enrolling certificates to a device, because after starting the management application, no more input is required by the administrator of the company for the certificate enrollment. Security during the enrollment is maintained because administrator cached credentials and an officially signed certificate of the SCEP server are used. Intercepting the public key by any other device will not work because the private key associated to this public key doesn't leave the device C, for which the certificate is requested.

Also other embodiments of the invention may be utilized by one skilled in the art without departing from the scope of the present invention. The method to enroll a certificate is advantageously applied to a company network to allow a secure connection of mobile devices to the company network, but the method may be used also any other computer networks, e.g. enterprise networks. Also other protocols instead of SCEP may be used for obtaining a digital certificate, for example a Certificate Management Protocol (CMP), which is an Internet protocol used for obtaining X.509 digital certificates in a public key infrastructure. Instead of a SCEP server, also any other CA certification authority server may be used. The invention resides therefore in the claims herein after appended.

The invention claimed is:

1. A method to enroll a certificate to a device, comprising:
providing a management application on a management device,
activating the management application on the management device,
discovering a device by the management application that needs certificate enrollment, and retrieving discovery information wherein the discovery information includes a public key of the device,
activating a certificate enrollment for the device via the management application,
forwarding the discovery information of the device to a certificate enrollment server by the management application,
notifying the device to apply for enrollment by the management application, by requesting a certificate enrollment at the certificate enrollment server, said request including the discovery information of the device, and
sending a signed certificate back to the device by the certificate enrollment server, when the discovery information as included in the certificate request of the device matches the discovery information as provided by the management application.

2. The method according to claim 1, wherein the device sends a certificate signing request (CSR) to the certificate enrollment server, the CSR containing the discovery information of the device.

3. The method according to claim 1, wherein the certificate enrollment server signs the CSR of the device and provides the certificate to the device, when the discovery information matches the discovery information that was forwarded by the application to the certificate enrollment server and sends the signed certificate back to the device.

4. The method according to claim 1, comprising: the management application contacting the certificate enrollment server by using cached administrator credentials of the management device and verifying the authenticity of the certificate enrollment server by verifying a digitally signed server certificate of the certificate enrollment server.

5. The method according to claim 1, comprising using a Data Distribution Service for Real-Time Systems (DDS) or a Simple Service Discovery Protocol (SSDP) for a discovery of the device.

6. The method according to claim 1, wherein the management device is an administration computer of a company network.

7. The method according to claim 1, wherein the certificate enrollment server is a Simple Certificate Enrollment Protocol (SCEP) server.

8. A method to enroll a certificate to a device, comprising:
activating a management application on a management device being arranged within a secure network,
the management application discovering a device outside of the secure network that needs a certificate enrollment for connecting to the secure network, wherein the device returns a discovery information including a discovery information of the device,
activating the certificate enrollment for the device by using the management application,
the management application contacting a Simple Certificate Enrollment Protocol (SCEP) server and forwarding the discovery information of the device to the SCEP server,
the device sending a certificate signing request to the SCEP server, the certificate signing request containing the discovery information of the device, and
the SCEP server signing the certificate signing request of the device and providing the certificate to the device, when the discovery information matches the discovery information that was forwarded by the management application to the SCEP server and sending the signed certificate back to the device.

9. The method according to claim 8, comprising the management application contacting the server by using cached administrator credentials of the management device and verifying the authenticity of the SCEP server by verifying a digitally signed server certificate of the SCEP server.

10. The method according to claim 8, comprising using a Data Distribution Service for Real-Time Systems (DDS) or a Simple Service Discovery Protocol (SSDP) for a discovery of the device.

11. The method according to claim 8, wherein the management device is an administration computer of a company network.

12. A management device comprising:
a control circuitry and a management application to enroll a certificate to a device, the management application being adapted to
discover a device that needs certificate enrollment, and retrieving discovery information of the device,
forward the discovery information of the device to a certificate enrollment server, and
notify the device to apply for enrollment.

13. A device comprising a control circuitry configured to send a discovery information including a discovery information of the device to a management device,
apply for certificate enrollment after notification of the device by a management application,
request a certificate enrollment at a certificate enrollment server, after having received the notification, by including the discovery information of the device in a certificate request for a secure certificate enrollment to the device, and
receive a signed certificate of the certificate enrollment server, when the discovery information as included in the certificate request of the device matches the discovery information as provided by the management application of the management device to the certificate enrollment server.

* * * * *